US008545332B2

(12) United States Patent
Marecki et al.

(10) Patent No.: US 8,545,332 B2
(45) Date of Patent: Oct. 1, 2013

(54) OPTIMAL POLICY DETERMINATION USING REPEATED STACKELBERG GAMES WITH UNKNOWN PLAYER PREFERENCES

(75) Inventors: Janusz Marecki, New York, NY (US); Richard B. Segal, Chappaqua, NY (US); Gerald J. Tesauro, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/364,843

(22) Filed: Feb. 2, 2012

(65) Prior Publication Data

US 2013/0204412 A1 Aug. 8, 2013

(51) Int. Cl.
*A63F 13/00* (2006.01)

(52) U.S. Cl.
USPC ............................................ 463/42; 705/7.11

(58) Field of Classification Search
USPC ........ 706/6; 705/7.11; 455/522; 463/25–43
See application file for complete search history.

(56) References Cited

U.S. PATENT DOCUMENTS

| | | | | |
|---|---|---|---|---|
| 8,014,809 | B2 * | 9/2011 | Bar-Ness et al. | 455/522 |
| 8,108,188 | B2 * | 1/2012 | Johnson | 703/6 |
| 8,195,490 | B2 * | 6/2012 | Tambe et al. | 705/7.11 |
| 8,224,681 | B2 * | 7/2012 | Tambe et al. | 705/7.11 |
| 2009/0088176 | A1 * | 4/2009 | Teo et al. | 455/452.1 |
| 2009/0119239 | A1 * | 5/2009 | Tambe et al. | 706/46 |

FOREIGN PATENT DOCUMENTS

EP 2182474 A2 * 5/2010

OTHER PUBLICATIONS

Pita, et al., "Deployed ARMOR protection: The application of a game-theoretic model for security at the Los Angeles International Airport", Proc. of 7th Int. Conf. on Autonomous Agents and Multiagent Systems (AAMAS 2008)—Industry and Applications Track, Berger, Burg, Nishiyama(eds.) May 12-16, 2008, pp. 125-132.
Tsai, et al., "IRIS—A tool for strategic security allocation in transportation networks", Proc. of 8th Int. Conf. on Autonomous Agents and Multiagent Systems (AAMAS 2009), Decker, Sichman, Sierra and Castelfranchi (eds.), May 10-15, 2009.
Alpcan, et al. "A game theoretic approach to decision and analysis in network intrusion detection," Proceedings of the 42nd IEEE Conference on Decision and Control, pp. 2595-2600 (2003).
Nguyen, et al., "Security games with incomplete information," in Proceeding of IEEE International Conference on Communications (ICC 2009) (2009).

(Continued)

*Primary Examiner* — Masud Ahmed
(74) *Attorney, Agent, or Firm* — Scully, Scott, Murphy & Presser, P.C.; Daniel P. Morris, Esq.

(57) ABSTRACT

A system, method and computer program product for planning actions in a repeated Stackelberg Game, played for a fixed number of rounds, where the payoffs or preferences of the follower are initially unknown to the leader, and a prior probability distribution over follower types is available. In repeated Bayesian Stackelberg games, the objective is to maximize the leader's cumulative expected payoff over the rounds of the game. The optimal plans in such games make intelligent tradeoffs between actions that reveal information regarding the unknown follower preferences, and actions that aim for high immediate payoff. The method solves for such optimal plans according to a Monte Carlo Tree Search method wherein simulation trials draw instances of followers from said prior probability distribution. Some embodiments additionally implement a method for pruning dominated leader strategies.

28 Claims, 7 Drawing Sheets

(56) References Cited

OTHER PUBLICATIONS

Letchford, et al., entitled "Learning and Approximating the Optimal Strategy to Commit to," in Proceedings of the Symposium on Algorithmic Game Theory, 2009.

Kocsis, et al., "Bandit based Monte-Carlo Planning" in 15th European Conference on Machine Learning, pp. 282-293, 2006.

Auer, et al., "Finite-time Analysis of the Multiarmed Bandit Problem", Machine Learning 47:235-256, 2002.

* cited by examiner

300

302

Input : $\sigma, b, \Sigma^{(k-1)}, \Sigma_{a_f}^{(k-1)}; \ a_f \in A_f$

Output: $\Sigma^{(k)}, \ \Sigma_{a_f}^{(k)}, \ a_f \in A_f$ 305

1: $\Sigma^{(k)} \leftarrow \Sigma^{(k-1)}$

2: for all $b' \in A_f$ do

3: $\Sigma_{b'}^{(k)} \leftarrow \Sigma_{b'}^{(k-1)}$

4: $\Sigma_{b}^{(k)} \leftarrow \mathrm{CONVEXHULL}(\Sigma_{b}^{(k)}, \sigma)$

5: for all $b' \in A_f$ do

6: $\overline{\Sigma}_{b'}^{(k)} \leftarrow \{\sigma' \in \Sigma \backslash \Sigma_{b'}^{(k)}$ s.t. $(\lambda\sigma' + (1-\lambda)\sigma'') \in \Sigma_{a_f}^{(k)}$ for some $\lambda > 0; \ \sigma'' \in \Sigma_{b'}^{(k)}$ and $a_f \in A_f; \ a_f \neq b'\}$ 7: $\sigma^* \leftarrow \arg\max[\sigma' \in \Sigma_{b}^{(k)}] \ \{U(\sigma', b)\}$ 8: $\Sigma^{(k)} \leftarrow \Sigma^{(k)} \backslash \Sigma_{b}^{(k)} \backslash \{\sigma^*\})$ 9: for all $\sigma \in \Sigma^{(k)} \backslash \cup_{a_f \in A_f} \Sigma_{a_f}^{(k)}$ and all $b \in A_f$ do

10: if $\sigma \in \cap_{a_f \in A_f} \backslash \{b\} \overline{\Sigma}_{fa}^{(k)}$ then

11: goto 4

FIG. 5

OPTIMAL POLICY DETERMINATION USING REPEATED STACKELBERG GAMES WITH UNKNOWN PLAYER PREFERENCES

The present disclosure relates generally to methods and techniques for determining optimal policies for network monitoring, public surveillance or infrastructure security domains.

BACKGROUND

Recent years have seen a rise in interest in applying game theoretic methods to real world problems wherein one player (referred to as the leader) chooses a strategy (which may be a non-deterministic i.e. mixed strategy) to commit to, and waits for the other player (referred to as the follower) to respond. Examples of such problems include network monitoring, public surveillance or infrastructure security domains where the leader commits to a mixed, randomized patrolling strategy in an attempt to thwart the follower from compromising resources of high value to the leader. In particular, a known technique referred to as the ARMOR system such as described in the reference to Pita, J., Jain, M., Western, C., Portway, C., Tambe, M., Ordonez, F., Kraus, S., Paruchuri, P. entitled Deployed ARMOR protection: The application of a game-theoretic model for security at the Los Angeles International Airport in *Proceedings of AAMAS* (Industry Track) (2008), suggests where to deploy security checkpoints to protect terminal approaches of Los Angeles International Airport. A further technique described in a reference to Tsai, J., Rathi, S., Kiekintveld, C., Ordonez, F., Tambe, M. entitled IRIS—A tool for strategic security allocation in transportation networks in *Proceedings of AAMAS* (Industry Track) (2009) proposes flight routes for the Federal Air Marshals to protect domestic and international flight from being hijacked and the PROTECT system (under development) suggests routes for the United States Coast Guard to survey critical infrastructure in the Boston harbor.

In arriving at optimal leader strategies for the above-mentioned and other domains, of critical importance is the leader's ability to profile the followers. In essence, determining the preferences of the follower actions is a vital step in predicting the follower rational response to leader actions which in turn allows the leader to optimize its mixed strategy to commit to. In security domains in particular it is very problematic to provide precise and accurate information about the preferences and capabilities of possible attackers. For example, the follower might have a different valuation from the leader valuation of the resources that the leader protects which leads to situations where some leader resources are at an elevated risk of being compromised. For example, a leader might value an airport fuel depot at $10 M whereas the follower (without knowing that the depot is empty) might value the same depot at $20 M. A fundamental problem that the leader thus has to address is how to act, over a prolonged period of time, given the initial lack of knowledge (or only a vague estimate) about the types of the followers and their preferences. Examples of such problems can be found in security applications for computer networks, see for instance, a reference to Alpcan, T., Basar, T. entitled "A game theoretic approach to decision and analysis in network intrusion detection," in *Proceedings of the* 42*nd IEEE Conference on Decision and Control*, pp. 2595-2600 (2003) and, see reference to Nguyen, K. C., Basar, T. A. T. entitled "Security games with incomplete information," in *Proceeding of IEEE International Conference on Communications* (ICC 2009) (2009) where the hackers are rarely caught and prevented from future attacks while their profiles are initially unknown.

Domains where the leader acts first by choosing a mixed strategy to commit to and the follower acts second by responding to the leader's strategy can be modeled as Stackelberg games.

In a Bayesian Stackelberg game the situation is more complex as the follower agent can be of multiple types (encountered with a given probability), and each type can have a different payoff matrix associated with it. The optimal strategy of the leader must therefore consider that the leader might end up playing the game with any opponent type. It has been shown that computing the Strong Bayesian Stackelberg Equilibrium is an NP-hard problem.

Formally, a Stackelberg game is defined as follows: $A_l=\{a_{l_1}, \ldots, a_{l_M}\}$ is a set of leader actions and $A_f=\{a_{f_1}, \ldots, a_{f_N}\}$ is a set of follower actions. (Note that the number M of leader actions does not have to be equal to the number N of follower actions.) Leader's utility function is $u_l$: $A_l \times A_f \rightarrow$. The follower is of a type $\theta$ from set $\Theta$, i.e., $\theta \in \Theta$, which determines its payoff function $u_f$: $\Theta \times A_l \times A_f \rightarrow$. The leader acts first by committing to a mixed strategy $\sigma \in \Sigma$ where $\sigma(a_l)$ is the probability of the leader executing its pure strategy $a_l \in A_l$. For a given leader strategy $a_l \in A_l$ and a follower of type $\theta \in \Theta$, the follower's "best" response $B(\theta,\sigma) \in A_f$ to $\sigma$ is a pure strategy $B(\theta,\sigma) \in A_f$ that satisfies:

$$B(\theta, \sigma) = \text{argmax}_{a_f \in A_f} \sum_{a_l \in A_l} \sigma(a_l) u_f(\theta, a_l, a_f).$$

Given the follower type $\theta \in \Theta$, the expected utility of the leader strategy $\sigma$ is therefore given by:

$$U(\theta, \sigma) = \sum_{a_l \in A_l} \sigma(a_l) u_l(a_l, B(\theta, \sigma)).$$

Given a probability distribution $P(\Theta)$ over the follower types, the expected utility of the leader strategy $\sigma$ over all the follower types is hence:

$$U(\sigma) = \sum_{\theta \in \Theta} P(\theta) \sum_{a_l \in A_l} \sigma(a_l) u_l(a_l, B(\theta, \sigma)). \quad (3)$$

Solving a single-round Bayesian Stackelberg game involves finding $$\sigma^* = \arg\max_{\sigma \in \Sigma} U(\sigma).$$

In an example Stackelberg game 10 such as shown in FIG. 1, first, a leader agent 11 (e.g., a security force) commits to a mixed strategy. The follower agent 13 (e.g., the adversary or opponent) of just a single type then observes the leader strategy and responds optimally to it, with a pure strategy, to maximize its own immediate payoff. For example, the leader mixed strategy to "Patrol Terminal #1" with probability 0.5 and "Patrol Terminal #2" with probability 0.5 triggers the follower strategy "Attack Terminal #1", because its expected utility of 0.5·(−2)+0.5·(2)=0 is greater than the expected utility of 0.5·(2)−0.5·(4)=−1 of the alternative response "Attacking Terminal #2". The expected utility for the above-mentioned leader strategy is therefore 0.5·(3)+0.5·(−2)=0.5 (which is higher than the utility for leader playing either of its two pure strategies).

Despite recent progress on solving Bayesian Stackelberg games (games where the leader faces an opponent of different types, with different preferences) it is commonly assumed that the payoff structure (and thus also their preferences) of both players are known to the players (either as the payoff matrices or the probability distributions over the payoffs).

It would be highly desirable to provide an approach to the problem of solving a repeated Stackelberg Game, played for a fixed number of rounds, where the payoffs or preferences of the follower and the prior probability distribution over follower types are initially unknown to the leader.

Multiple Rounds, Unknown Followers

In repeated Stackelberg games such as described in Letchford et al., entitled "Learning and Approximating the Optimal Strategy to Commit To," in *Proceedings of the Symposium on Algorithmic Game Theory,* 2009, nature first selects a follower type $\theta \in \Theta$, upon which the leader then plays H rounds of a Stackelberg game against that follower. Across all rounds, the follower is assumed to act rationally (albeit myopically), whereas the leader aims to act strategically, so as to maximize total utility collected in all H stages of the game. The leader may never quite learn the exact type $\theta$ that it is playing against: Instead, the leader uses the observed follower responses to its actions to narrow down the subset of types and utility functions that are consistent with the observed responses.

To illustrate the concept of a repeated Stackelberg game with unknown follower preferences refer again to FIG. 1, but this time, assume that the follower payoffs indicated as follower payoffs 16, 18 are unknown to the leader. If the game was played for only a single round and the leader believed that each response of the follower is equally likely (e.g., with probability 0.5), then the optimal (mixed) strategy of the leader would be to "Patrol Terminal #1" with probability 1.0, as this provides the leader with the expected utility of 0.5*3+0.5*(−1)=1. (Note that the worst mixed strategy of the leader is to "Patrol Terminal #2" with probability 1.0, yielding the expected utility of 0.5*(−2)+0.5*2=0.) Now, if the Stackelberg game spans two rounds, the optimal strategy of the leader is conditioned on the leader observation of the follower response in the first round of the game. In particular, if the leader plays "Patrol Terminal #1" in the first round and observes the follower response "Attack Terminal #2", the optimal action of the leader in the next round is to switch to "Patrol Terminal #2" with probability 1.0 which yields the expected utility of 0 as opposed to continue to "Patrol Terminal #1" with probability 1.0 which yields the exact utility of −1. In contrast, if the leader plays "Patrol Terminal #1" in the first round and observes the follower response "Attack Terminal #1", the optimal action of the leader in the next round is to continue to "Patrol Terminal #1" with probability 1.0, which yields the exact utility of 3. In so doing, the leader has deliberately chosen not to learn anything about the follower preferences in response to the leader strategy "Patrol Terminal #2", as this extra information cannot improve on the utility of 3 that the leader is now guaranteed to receive by "Patrolling Terminal #2". This contrasts sharply with the approach in above-identified Letchford et al. where the leader would choose to "Patrol Terminal #2", to learn the complete follower preference structure in as few game rounds as possible.

Letchford et al. propose a method for learning the follower preferences in as few game rounds as possible, however, this technique is deficient: First, while the method ensures that the leader learns the complete follower preferences structure (i.e. follower responses to any mixed strategy of the leader) in as few rounds as possible (by probing the follower responses with carefully chosen leader mixed strategies), it ignores the payoffs that the leader is receiving during in these rounds. In essence, the leader only values exploration of the follower preferences and ignores the exploitation of the already known follower preferences, for its own benefit. Second, the method of the prior art solution does not allow the follower to be of many types.

Further, existing work has predominantly focused on single-round games and as such, only the exploitation part of the problem was being considered. That is, methods may compute the optimal leader mixed strategy for just a single round of the game, given all the available information about the follower preferences and/or payoffs. While in contrast, the work by Letchford et al. considers a repeated-game scenario, it does not consider that the leader would optimize her own payoffs. Instead that work presumed that the leader would act so as to uniquely determine the follower preferences in the fewest number of rounds of rounds which may be arbitrarily expensive for the leader. In addition, the technique proposed by Letchford et al. only considers non-Bayesian Stackelberg game in that the authors assumed that the follower is of a single type.

SUMMARY

A system, method and computer program product for solving a repeated Stackelberg Game, played for a fixed number of rounds, where the payoffs or preferences of the follower and the prior probability distribution over follower types are initially unknown to the leader.

Accordingly, there is provided a system, method and computer program product for planning actions in repeated Stackelberg games with unknown opponents, in which a prior probability distribution over preferences of the opponents is available, the method comprising: running, in a simulator including a programmed processor unit, a plurality of simulation trials from a root node specifying the initial state of a repeated Stackelberg game, that results in an outcome in the form of a utility to the leader, wherein one or more simulation trials comprises one or more rounds comprising: selecting, by the leader, a mixed strategy to play in the current round; determining at a current round, a response of the opponent, of type fixed at the beginning of a trial according to the prior probability distribution, to the leader strategy selected; computing a utility of the leader strategy given the opponent response in the current round; updating an estimate of expected utility for the leader action at this round; and, recommending, based on the estimated expected utility of leader actions at the root node, an action to perform in the initial state of a repeated Stackelberg game, wherein a computing system including at least one processor and at least one memory device connected to the processor performs the running and the recommending.

Further to this aspect, the simulation trials are run according to a Monte Carlo Tree Search method.

Further, according to the method, at the one or more rounds, the method further comprises inferring opponent preferences given observed opponent responsive actions in prior rounds up to the current round.

Further, according to the method, the inferring further comprises: computing opponent best response sets and opponent best response anti-sets, said opponent best response set being a convex set including leader mixed strategies for which the leader has observed or inferred that the opponent will respond by executing an action, and said best response anti-sets each being a convex set that includes leader mixed strategies for which the leader has inferred that the follower will not respond by executing an action.

Further, in one embodiment, the processor device is further configured to perform pruning of leader strategies satisfying one or more of: suboptimal expected payoff in the current round, and a suboptimal expected sum of payoffs in subsequent rounds.

Further, the leader actions are selected from among a finite set of leader mixed strategies, wherein said finite set comprises leader mixed strategies whose pure strategy probabilities are integer multiples of a discretization interval.

Further, in one embodiment, the estimate of an expected utility of a leader action includes a benefit of information gain about an opponent response to said leader action combined with an immediate payoff for the leader for executing said leader action.

Further, in one embodiment, the updating the estimate of expected utility for the leader action at the current round comprises: averaging the utilities of the leader action at the current round, across multiple trials that share the same history of leader actions and follower responses up to the current round.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which:

FIG. 5 is a pseudo-code depiction of an embodiment of a pruning method 500 for pruning not-yet-employed leader strategies that do not achieve in maximizing expected leader utility;

DETAILED DESCRIPTION

Figure 1:
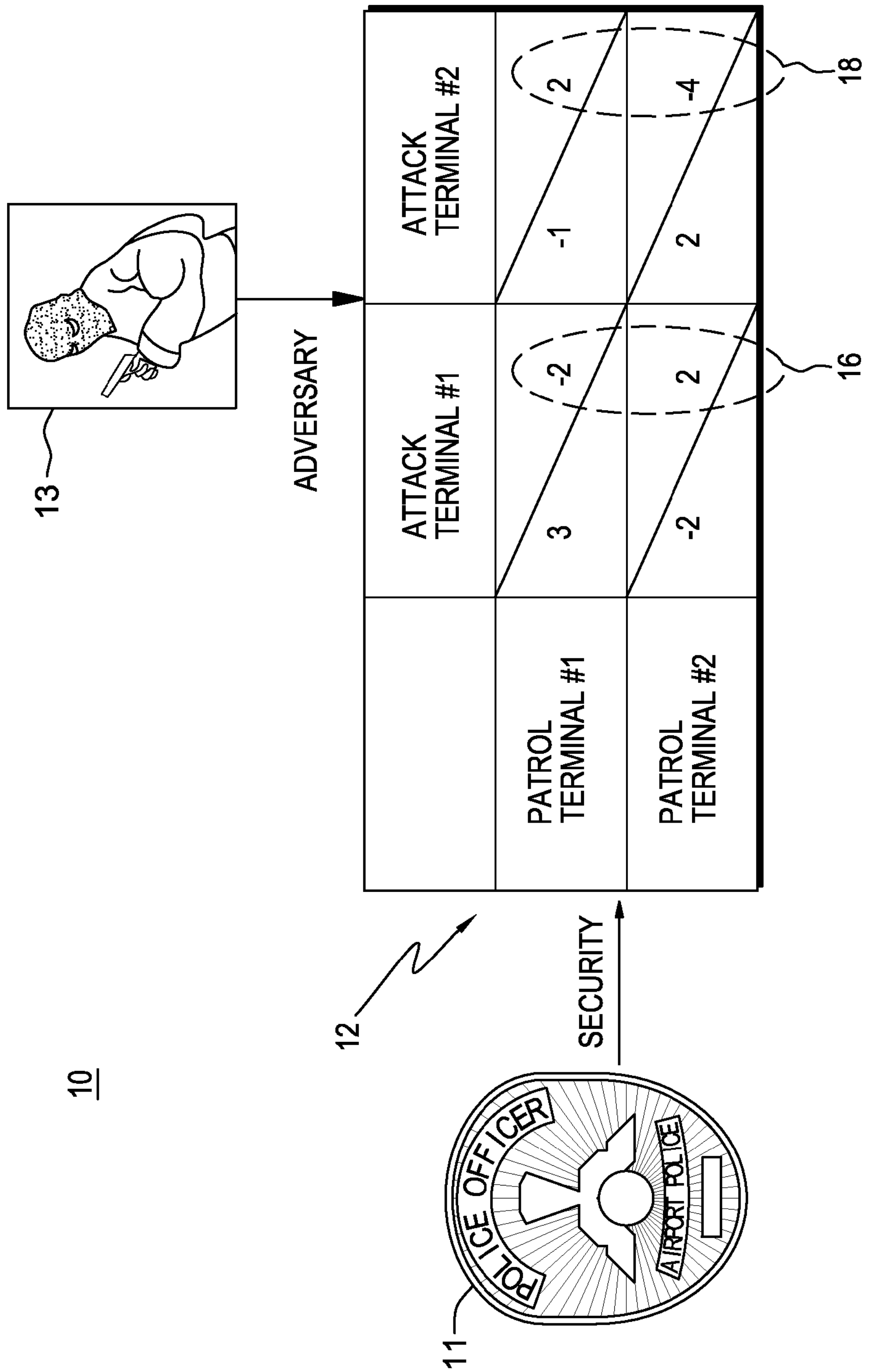
FIG. 1 illustrates the concept of a repeated Stackelberg game with unknown follower preferences.

In one aspect, there is formulated a Stackelberg game problem, and in particular, a Multi-round Stackelberg game having 1) Unknown adversary types; and, 2) Unknown adversary payoffs (e.g., follower preferences). A system, method and computer program product provides a solution for exploring the unknown adversary payoffs or exploiting the available knowledge about the adversary to optimize the leader strategy across multiple rounds.

In one embodiment, the method optimizes the expected cumulative reward-to-go of the leader who faces an opponent of possibly many types and unknown preference structures.

In one aspect, the method employs the Monte Carlo Tree Search (MCTS) sampling technique to estimate the utility of leader actions (its mixed strategies) in any round of the game. The utility is understood as comprising the benefit of information gain about the best follower response to a given leader action combined with immediate payoff for the leader for executing the leader action. In addition, for improving the efficiency of MCTS employed to the problem at hand, the method further performs determining what leader actions, albeit applicable, should not be considered by the MCTS sampling technique.

One key innovation of MCTS is to incorporate node evaluations within traditional tree search techniques that are based on stochastic simulations (i.e., "rollouts" or "playouts"), while also using bandit-sampling algorithms to focus the bulk of simulations on the most promising branches of the tree search. This combination appears to have overcome traditional exponential scaling limits to established planning techniques in a number of large-scale domains.

Standard implementations of MCTS maintain and incrementally grow a collection of nodes, usually organized in a tree structure, representing possible states that could be encountered in the given domain. The nodes maintain counts $n_{sa}$ of the number of simulated trials in which action a was selected in state s, as well as mean reward statistics $\bar{r}_{sa}$ obtained in those trials. A simulation trial begins at the root node, representing the current state, and steps of the trial descend the tree using a tree-search policy that is based on sampling algorithms for multi-armed bandits that embody a tradeoff between exploiting actions with high mean reward, and exploring actions with low sample counts. When the trial reaches the frontier of the tree, it may continue performing simulation steps by switching to a "playout policy," which commonly selects actions using a combination of randomization and simple heuristics. When the trial terminates, sample counts and mean reward values are updated in all tree nodes that participated in the trial. At the end of all simulations, the reward-maximizing top-level action from the root of the tree is selected and performed in the real domain.

One implementation of MCTS makes use of the UCT algorithm (e.g., as described in L. Kocsis and C. Szepesvari entitled "Bandit based Monte-Carlo Planning" in 15th European Conference on Machine Learning, pages 282-293, 2006), which employs a tree-search policy based on a variant of the UCB1 bandit-sampling algorithm (e.g., as described in the reference "Finite-time Analysis of the Multiarmed Bandit Problem" by P. Auer, et al. from Machine Learning 47:235-256, 2002). The policy computes an upper confidence bound $B_{sa}$ for each possible action a in a given state s according to: $B_{sa}=\bar{r}_{sa}+c\sqrt{\ln N_s/n_{sa}}$, where $N_s=\Sigma_a n_{sa}$, is the total number of trials of all actions in the given state, and c is a tunable constant controlling the tradeoff between exploration and exploitation. With an appropriate choice of the value of c, UCT is guaranteed to converge to selecting the best top-level action with probability 1.

MCTS in Repeated Stackelberg Games

Figure 2:
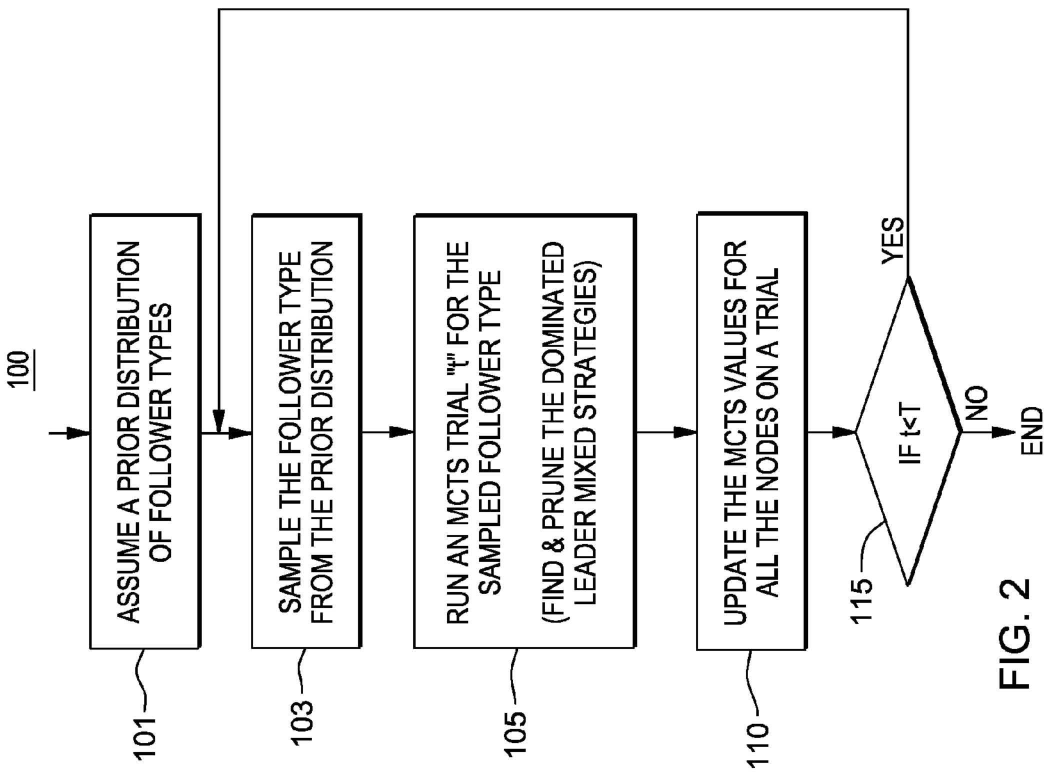
FIG. 2, in one embodiment of the MCTS-based method 100 for planning leader actions in repeated Stackelberg games with unknown followers (opponents)

FIG. 2 shows one embodiment of the MCTS-based method 100 for planning leader actions in repeated Stackelberg games with unknown opponents. As indicated at 101, one feature of the MCTS-based method for planning leader actions in repeated Stackelberg games with unknown opponents builds upon the assumption that the leader has a prior probability distribution over possible follower types (equivalently, over follower utility functions). This is leveraged by performing MCTS trials in which each trial simulates the behavior of the follower using an independent draw from this distribution. As different follower types transition down different branches of the MCTS tree, this provides a means of implicitly approximating the posterior distribution for any given history in the tree, where the most accurate posteriors are focused on the most critical paths for optimal planning. This enables much faster approximately optimal planning than established methods which require fully specified transition models for all possible histories as input to the method.

Figure 3:
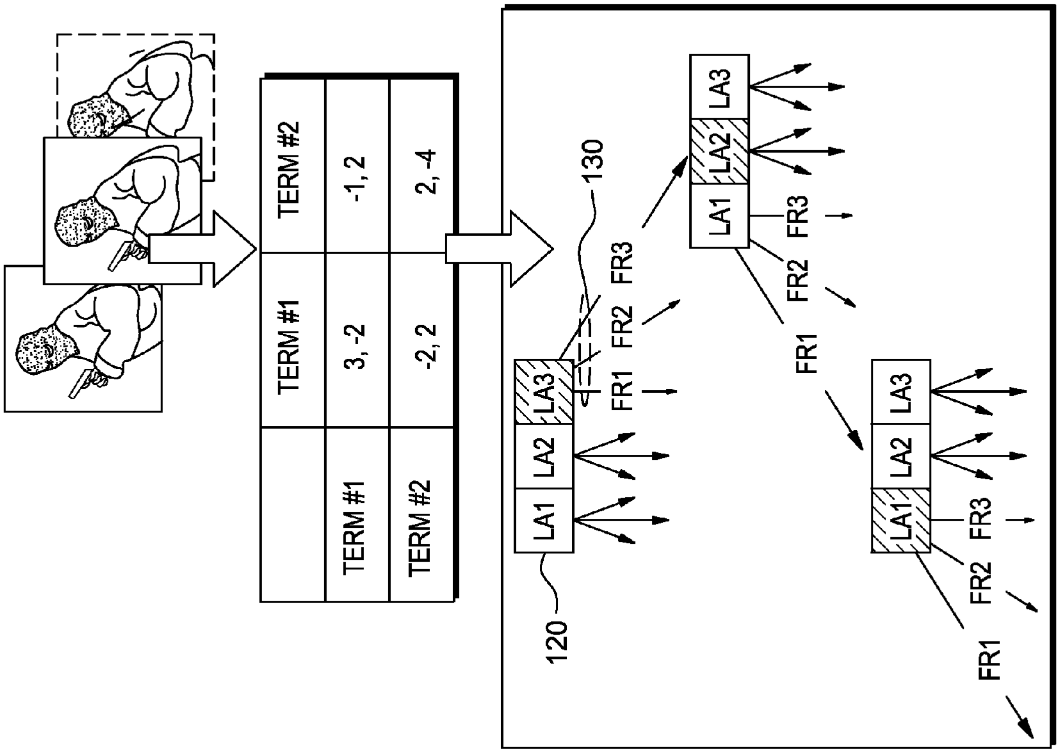
FIG. 3 depicts, in one embodiment, an example simulated trial showing leader actions (LA) performing mixed strategies (LA1, LA2, LA3) where a follower then plays its best-response pure-strategy follower response strategy (FR1, FR2, FR3)

As further shown in FIG. 2, in one embodiment of the MCTS-based method 100 for planning leader actions in repeated Stackelberg games with unknown opponents, the method performs a total of T simulated trials, as shown at 115, each with a randomly drawn follower at 103, where a trial consists of H rounds of play. In each round, the leader chooses a mixed strategy $\sigma \in \Sigma$ to be performed, that is, to play each pure strategy $a_l \in A_l$ with probability $\sigma(a_l)$. To obtain a finite enumeration of leader mixed strategies, the $\sigma(a_l)$ values are discretized into integer multiples of a discretization interval $\in = 1/K$, and represent the leader mixed strategy components as $\sigma(a_l) = k_l \cdot \in$ where $\{k_l\}$ is a set of non-negative integers s.t. $\Sigma k_l = K$. In the example in FIG. 3 $|A_l| = 2$ and K=2 and the leader can choose to perform only one of the following mixed strategies 120: LA1=[0.0,1.0]; LA2=[0.5,0.5] or LA3=[1.0, 0.0] where LA is a leader action. Upon observing the leader mixed strategy, the follower then plays a greedy pure-strategy response 130; that is, it selects from among its pure strategies 130 (FR1, FR2, FR3) where FR is a follower response as shown in FIG. 3 the strategy achieving highest expected payoff for the follower, given the observed leader mixed strategy.

Leader strategies in each round of each trial are selected by MCTS using either the UCB1 tree-search policy for the initial rounds within the tree, or a playout policy for the remaining rounds taking place outside the tree. One playout policy uses uniform random selection of leader mixed strategies for each remaining round of the playout. The MCTS tree is grown incrementally with each trial, starting from just the root node at the first trial. Whenever a new leader mixed strategy is tried from a given node, the set of all possible transition nodes (i.e. leader mixed strategy followed by all possible follower responses) are added to the tree representation.

In one aspect, as shown in FIG. 2, a complete H-round game is played T times (each H-round game is referred to as a single trial). At the beginning of each trial, an opponent type is drawn from the prior probability distribution over opponent types. In one embodiment, this prior distribution can be uniform. Subsequently, a simulator device (but not the leader) knows the complete payoff table of the current follower. In each round of the game the leader chooses one of its mixed strategies (LA1,LA2 or LA3 as shown in FIG. 3) to commit to and observes the follower responses (FR1, FR2 or FR3 as shown in FIG. 3). As there are an infinite number of leader mixed strategies, LA1, LA2 and LA3 only constitute a chosen subset of mixed strategies that cover the space of all the leader strategies with arbitrary density. Note that for a given leader mixed strategy, the follower response must essentially be the same in all H rounds of the game, because the follower type is fixed at the beginning of the trial. However, across the trials, the follower responses to a given leader actions at a given round of the game might differ which reflects the fact that different follower types (drawn from the prior distribution at the beginning of each trial) correspond to different follower payoff tables and consequently different follower best responses to a given leader strategy. As such, as indicated at step 110, FIG. 2, for any node in the MCTS search tree, MCTS maintains only estimates of the true expected cumulative reward-to-go for each leader strategy. However, as the number of trials M approaches infinity, these estimates converge to their exact optimal values.

For improving the efficiency of MCTS employed, some embodiments of the method also perform determining what leader actions, albeit applicable, should not be considered by the MCTS sampling technique.

Pruning of Leader's Strategies

In some cases, the leader's exploration of the complete reward structure of the follower is unnecessary. In essence, in any round of the game, the leader can identify unsampled leader mixed strategies whose immediate expected value for the leader is guaranteed not to exceed the expected value of leader strategies employed by the leader in the earlier rounds of the game. If the leader then just wants to maximize the expected payoff of its next action, these not-yet-employed strategies can safely be disregarded (i.e., pruned).

As indicated at step 110, FIG. 2, for pruning of dominated leader strategies it is assumed that the leader is playing a repeated Stackelberg game with a follower of type $\theta \in \Theta$. Furthermore, $E^{(n)} \subset \Sigma$ denotes a set of leader mixed strategies that have been employed by the leader in rounds 1,2, . . . , n of the game. Notice, that a leader aiming to maximize its payoff in the n+1$^{st}$ round of the game considers employing an unused strategy $\sigma \in \Sigma - E^{(n)}$ only if:

$$\overline{U}(\theta, \sigma) > \max_{\sigma' \in E^{(n)}} U(\theta, \sigma') \tag{1}$$

Where $\overline{U}(\theta, \sigma)$ is the upper bound on the expected utility of the leader playing $\sigma$, established from the leader observations $B(\theta, \sigma')$; $\sigma' \in E^{(n)}$ as follows:

$$\overline{U}(\theta, \sigma) = \max_{a_f \in A_f(\sigma)} U(\sigma, a_f). \tag{2}$$

Where $A_f(\sigma) \subset A_f$ is a set of follower actions $a_f$ that can still (given $B(\theta, \sigma')$; $\sigma' \in E^{(n)}$) constitute the follower best response to $\sigma$ while $U(\sigma, a_f)$ is the expected utility of the leader mixed strategy $\sigma$ if the follower responds to it by executing action $a_f$. That is:

$$U(\sigma, a_f) = \sum_{a_l \in A_l} \sigma(a_l) u_l(a_l, a_f) \tag{3}$$

Thus, in order to determine whether a not-yet-employed strategy $\sigma$ should be executed, the method includes determining the elements of a best response set $A_f(\sigma)$ given $B(\theta, \sigma')$; $\sigma' \in E^{(n)}$.

Best Response Sets

To find the actions that can still constitute the best response of the follower of type $\theta$ to a given leader strategy $\sigma$, there is first defined the concept of Best Response Sets and Best Response Anti-Sets.

For each action $a_f \in A_f$ of the follower, there is first defined a best response set $\Sigma_{a_f}$ as a set of all the leader strategies $\sigma \in \Sigma$ for which it holds that $B(\theta, \sigma) = a_f$.

For each action $a_f \in A_f$ of the follower, there is second defined a best response anti-set $\bar{\Sigma}_{a_f}$ is a set of all the leader strategies $\sigma \in \Sigma$ for which it holds that $B(\theta,\sigma) \neq a_f$.

It is proved by contradiction a first proposition ("Proposition 1") that each best response set $\Sigma_{a_f}$ is convex and $\{\Sigma_{a_f}\}_{a_f \in A_f}$ is a finite partitioning of $\Sigma$ (set of leader mixed strategies). That is, for each follower type $\theta \in \Theta$ there exists a partitioning and $\{\Sigma_{a_f}\}_{a_f \in A_f}$ of the leader strategy space $\Sigma$ such that $\Sigma_{a_f}$; $a_f \in A_f$ are convex and $B(\theta,\sigma')=B(\theta,\sigma'')$ for all $\sigma'$, $\sigma'' \in \Sigma_{a_f}$ ("Lemma 1" as referred to herein).

Figure 4:
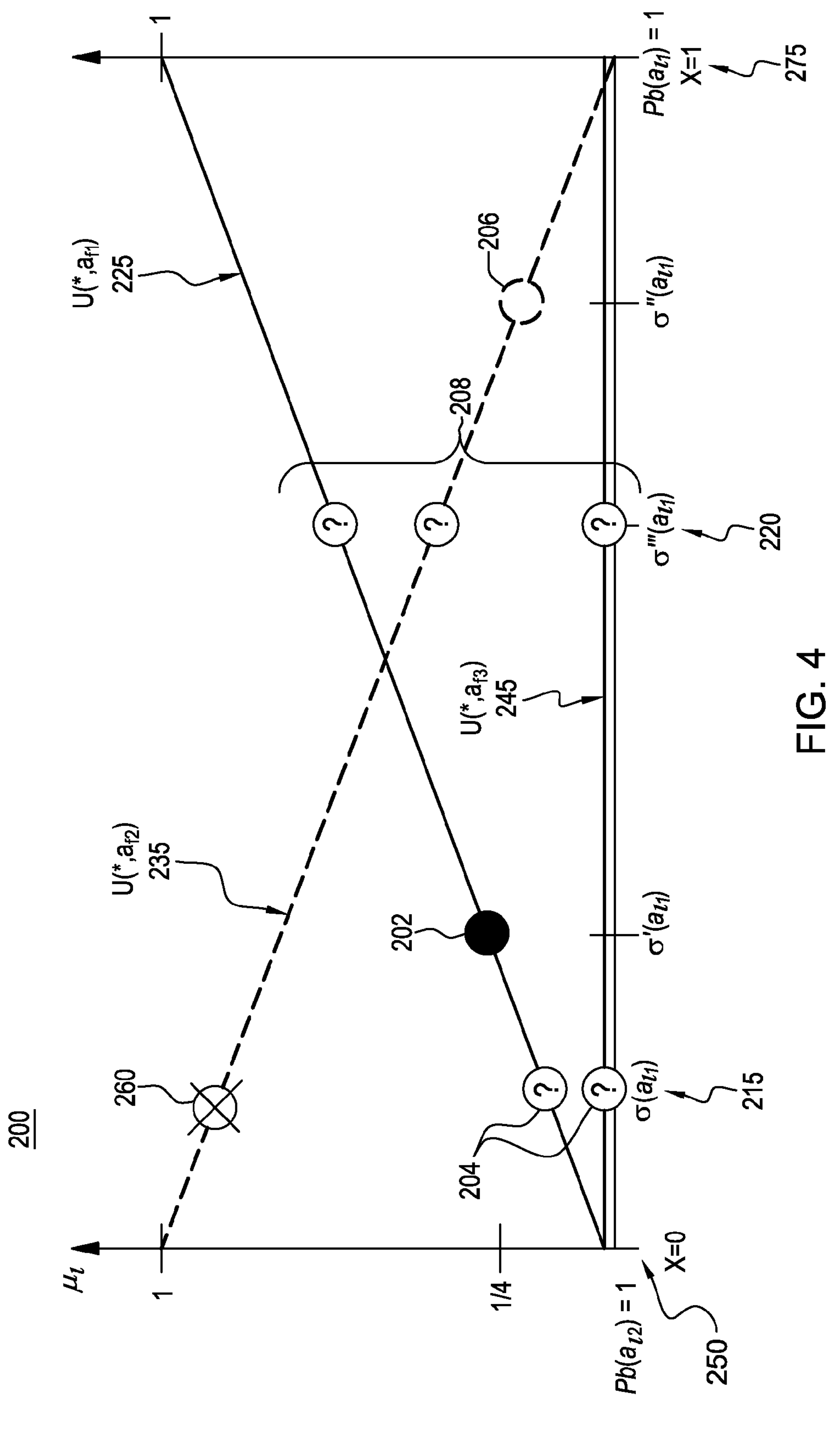
FIG. 4 illustrates by way of example a depiction of the method 400 for finding the follower best responses after a few rounds of play.

Finding the follower best response(s) is now illustrated by an example such as shown in FIG. 4. Specifically, it is illustrated that (after a few rounds of the games) there may indeed exist $\sigma \in \Sigma$ such that $A_f(\sigma) \neq A_f$. Consider the example 200 in FIG. 4 where the game has already been played for two rounds. Let $A_l=\{a_{l_1},a_{l_2}\}$, $A_f=\{a_{f_1},a_{f_2},a_{f_3}\}$ and $E^{(2)}=\{\sigma',\sigma''\}$ where $\sigma'(a_{l_1})=0.25$; $\sigma'(a_{l_2})=0.75$ and $\sigma''(a_{l_1})=0.75$; $\sigma''(a_{l_2})=0.25$. Furthermore, assume $U(a_{l_1},a_{f_1})=0$; $U(a_{l_2},a_{f_1})=1$; $U(a_{l_1},a_{f_2})=1$; $U(a_{l_2},a_{f_2})=0$ and $U(a_{l_1},a_{f_3})=U(a_{l_2},a_{f_3})=0$. The follower best responses observed so far are $B(\theta,\sigma')=a_{f_1}$ as indicated as 202 in FIGS. 4 and $B(\theta,\sigma'')=a_{f_2}$ 206.

Notice, how in this example context it is not profitable for the leader to employ a mixed strategy $\sigma$ such that $\sigma(a_{l_1}) \in [0, \sigma'(a_{l_1})) \cup (\sigma''(a_{l_1}),1]$. In particular, for $\sigma$ such that $\sigma(a_{l_1}) \in [0,\sigma'(a_{l_1}))$ (refer to FIG. 4 x-axis point $\sigma$ 215), it holds that $B(\theta,\sigma) \neq a_{f_2}$ because otherwise (from Proposition (1)) the convex set $$\sum_{a_{f_2}}$$

would contain the elements $\sigma$ and $\sigma''$—and hence also contain the element $\sigma'$—which is not true since $B(\theta,\sigma')=a_{f_1} \neq a_{f_2}$. Consequently, it is true that $A_f(\sigma)=\{a_{f_1},a_{f_3}\}$ (illustrated in FIG. 4 as points with 204 above $\sigma$), which implies that $\bar{U}(\theta,\sigma)=\max\{U(\sigma,a_{f_1}),U(\sigma,a_{f_3})\}<\max\{0.25,0\}=0.25=\max\{U(\sigma',a_{f_1}),U(\sigma'',a_{f_2})\}$.

Hence, while employing strategy $\sigma$ would allow the leader to learn $B(\theta,\sigma)$ (i.e., to disambiguate in FIG. 4 the question marks at points 204 above $\sigma$), this knowledge would not translate into the leader higher payoffs: The immediate expected reward for the leader for employing strategies $\sigma',\sigma''$ is always greater than the expected reward for employing $\sigma$ such that $\sigma(a_{l_1}) \in [0,\sigma'(a_{l_1})) \cup (\sigma''(a_{l_1}),1]$.

Thus, considering one MCTS trial, that is, one complete H-round game utilizing a fixed follower type, as shown in the FIG. 4 here, there are two leader pure strategies $a_{l2}$ and $a_{l1}$ located at extreme points 250, 275 of the x-axis (at at x=0 and x=1 respectively) (thus an infinite number of leader mixed strategies on the x-axis) and three follower pure strategies. The solid line 225, dashed lines 235 and solid lines 245 represent the leader payoffs if the follower responds to the leader actions with its pure strategy FR1, FR2 and FR3 respectively. There is provided a proof of a lemma that there is a partitioning of the leader strategy space (here, the x-axis) into K convex sets (here, K=3) so that the follower response for each leader strategy from a set is the same. The consequence of that lemma (in the example provided) is the following: Assume that $\sigma'$ and $\sigma''$ are the leader actions that have been executed in the first two rounds of the game, provoking responses FR1 and FR2 respectively. As a result of the lemma, the follower response to the leader strategy $\sigma$ cannot be FR2 as indicated by the crossed circle 260 in FIG. 4, and hence can only be FR1 or FR3, yielding the leader payoffs marked by the indicators 204. Yet, none of these leader payoffs exceeds the payoff that the leader received for committing to its strategy $\sigma'$ in the first round of the game. The leader can then conclude that it is pointless to attempt to learn the follower best response to the leader strategy $\sigma$. As such, the MCTS method does not even have to consider trying action $\sigma$ 215 in the third round of the game, for the current trial.

The example in FIG. 4 also illustrates the leader balancing the benefits of exploration versus exploitation in the current round of the game. Specifically, the leader has a choice to either play one of the strategies $\sigma'$, $\sigma''$ it had employed in the past (e.g., $\sigma'$ if $U(\sigma',a_{f_1})>U(\sigma'',a_{f_2})$ or $\sigma''$ otherwise), or play some strategy $\sigma'''$ 220 such that $\sigma'''(a_{l_1}) \in (\sigma'(a_{l_1}),\sigma''(a_{l_1}))=[0,1]\backslash[0,\sigma'(a_{l_1}))\backslash(\sigma''(a_{l_1}),1]$ that it had not yet employed—and hence does not know what the follower best response $B(\theta,\sigma''')$ for this strategy is. Notice, that in this case, $A_f(\sigma''')=\{a_{f_1}, a_{f_2}, a_{f_3}\}$ (illustrated in FIG. 4 by three points 208 with question marks above $\sigma'''$ 220). Now, if $B(\theta,\sigma''')=a_{f_3}$ were true, it would mean that $U(\sigma''',a_{f_3})<\max\{U(\sigma',a_{f_1}),U(\sigma'',a_{f_2})\}$. In such case, the leader explores the follower payoff preference (by learning $B(\theta,\sigma''')$) at a cost of reducing immediate payoff by $U(\sigma''',a_{f_3})-\max\{U(\sigma',a_{f_1}),U(\sigma'',a_{f_2})\}$.

Finally, the example in FIG. 4 also demonstrates that even though the immediate expected utility for executing a not-yet-employed strategy is smaller than the immediate expected utility for executing a strategy employed in the past, in some cases it might be profitable not to prune such not-yet-employed strategy. For example, if the game in FIG. 4 is going to be played for at least two more rounds, the leader might still have an incentive to play $\sigma$, because if it turns out that $B(\theta,\sigma)=a_{f_3}$ then (from Proposition 1) $B(\theta,\sigma''') \neq a_{f_3}$ and consequently $\bar{U}(\theta,\sigma''')>\max\{U(\sigma',a_{f_1}),U(\sigma'',a_{f_2})\}$. In essence, if the execution of a dominated strategy can provide some information about the follower preferences that will become critical in subsequent rounds of the game, one pruning heuristic might be to not prune such strategy.

The method in one embodiment provides a fully automated procedure for determining these leader strategies that can be safely eliminated from the MCTS action space in a given node, for a given MCTS trial.

The Pruning Method

When an MCTS trial starts (at the root node), the follower type is initially unknown, hence the leader does not know any follower best response sets $\Sigma_{a_f}$ and anti-sets $\bar{\Sigma}_{a_f}$; $a_f \in A_f$. As the game enters subsequent rounds though, the leader collects the information about the follower responses to the leader strategies, assembles this information to infer more about $\Sigma_{a_f}$ and $\bar{\Sigma}_{a_f}$; $a_f \in A_f$ and then prunes any provably dominated leader strategies that do not provide critical information to be used in later rounds of the game.

FIG. 5 is a depiction of an embodiment of a pruning method 300 for pruning not-yet-employed leader strategies. The method is executed as programmed steps in a simulator such as a program executing in computing system shown in FIG. 7.

At a basic level, the pruning method maintains convex best response sets $$\sum_{a_f}^{(k-1)}$$

and best response anti-sets $$\bar{\sum}_{a_f}^{(k-1)}$$

for all actions $a_f$ from $A_f$, each convex set $$\sum_{a_f}^{(k-1)}$$

including only these leader mixed strategies for which the leader has observed (or inferred) that the follower has responded by executing action $a_f$ from $A_f$. Conversely, each anti-set $$\overline{\sum_{a_f}^{(k-1)}}$$

contains the leader mixed strategies for which the leader has inferred that the follower cannot respond with an action $a_f$ from $A_f$, given the current evidence, that is, the elements of sets $$\overline{\sum_{a_f}^{(k-1)}}$$

(because otherwise, it would invalidate the convexity of sets $$\sum_{a_f}^{(k-1)}$$

for some actions $a_f$ from $A_f$, from Lemma 1).

The pruning method runs independently of MCTS and can be applied to any node whose parent has already been serviced by the pruning method. There is provided to the programmed computer system including a processor device and memory storage system, data maintained at such node corresponding to a situation where the rounds 1,2, . . . , k−1 of the game have already been played. At 302, there is input the set of leader strategies that have not yet been pruned denoted as $\Sigma^{(k-1)} \subset \Sigma$ (and not to be confused with the set $E^{(k-1)}$ of leader strategies employed in rounds 1,2, . . . , k−1 of the game). There is $\Sigma^{(0)}=\Sigma$ at the root node. Also, at 302 there is assigned $$\sum_{a_f}^{(k-1)} \subset \sum_{a_f}$$

and $$\overline{\sum_{a_f}^{(k-1)}} \subset \overline{\sum_{a_f}}$$

$\subset \Sigma_{a_f}$ as the partially uncovered follower best response sets and anti-sets, inferred by the leader from its observations of the follower responses in rounds 1,2, . . . , k−1 of the game. (Unless $|A_f|=1$, there is $$\sum_{a_f}^{(0)} = \emptyset,\ \overline{\sum_{a_f}^{(0)}} = \emptyset;\ a_f \in A_f$$

at the root node.) As an input 302, when the leader then plays $\sigma \in \Sigma^{(k-1)}$ in the k-th round of the game and observes the follower best response $b \in A_f$, the method constructs the sets $$\sum^{(k)},\ \sum_{a_f}^{(k)},\ \overline{\sum_{a_f}^{(k)}};\ a_f \in A_f$$

output at 305, as described in the method 300 depicted in FIG. 5.

In FIG. 5, the method 300 commences by cloning the non-pruned action set (at line 1) and best response sets (at lines 2 and 3). Then, at line 4, $\Sigma_b^{(k)}$ becomes the minimal convex hull that encompasses itself and the leader strategy σ (computed e.g., using a linear program). At this point (lines 5 and 6), the method constructs the best response anti-sets, for each $b' \in A_f$. In particular: $\sigma' \notin \Sigma_{b'}^{(k)}$ is added to the anti-set $$\overline{\sum_{b'}^{(k)}}$$

if there exists a vector (σ',σ") where $$\sigma'' \in \sum_{b'}^{(k)}$$

that intersects some set $$\sum_{a_f}^{(k)};$$

$a_f \neq b$ (else, $$\sum_{b'}^{(k)} \bigcup \{\sigma'\}$$

would not be convex, thus violating Proposition 1). Next (at lines 7 and 8), the method 300 prunes from $\Sigma^{(k)}$ all the strategies that are strictly dominated by σ*, for which the leader already knowns the best response $b \in A_f$ of the follower. (It is noticed that no further information about the follower preferences can be gained by pruning these actions.) Finally, the method loops (at line 9) over all the non-pruned leader strategies σ for which the best response of the follower is still unknown; In particular (at line 10) if $b \in A_f$ is the only remaining plausible follower response to σ, it automatically becomes the best follower response to σ and the method goes back to line 4 where it considers the response b to the leader strategy σ as if it was actually observed. The pruning method terminates its servicing of a node once no further actions can be pruned from $\Sigma^{(k)}$.

Figure 6:
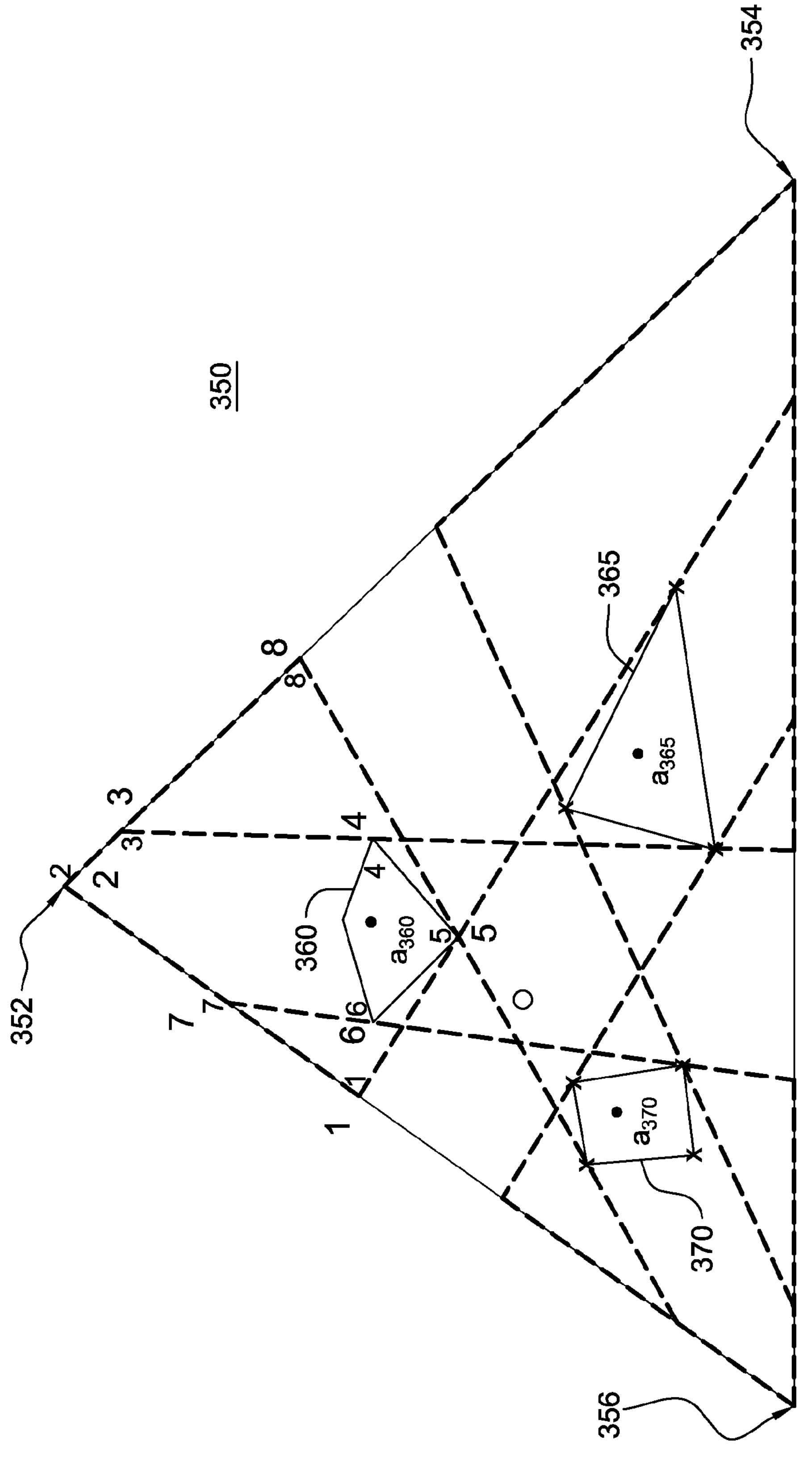
FIG. 6 shows conceptually, implementation of the pruning method employed for an example case in which a mixed leader strategy is implemented, e.g., modeled as a 3-dimensional space 350; and, FIG. 7 illustrates an exemplary hardware configuration for implementing the method in one embodiment.

FIG. 6 shows conceptually, implementation of the pruning method employed for an example case in which a mixed leader strategy is implemented, e.g., modeled as a 3-dimensional space 350. That is, a simplex space 350 is shown corresponding, for example, to a security model, e.g., a single guard patrolling 3 different doors of a building according to a mixed strategy, i.e., a rule for performing available pure strategies with probabilities that sum to one. Opponent responses are represented as response to 3 different leader strategies. There are three leader pure strategies 352, 354, 356, (corners of the simplex) and three adversary pure strategies, denoted as $a_{360}$, $a_{370}$ and $a_{365}$. Solid convex sets 360, 370, 365 are the regions of the simplex space where the best responses of the opponent, $a_{360}$, $a_{370}$ and $a_{365}$ respectively, are already known (i.e., either observed or inferred earlier). The antisets are also known. For example, set 360 implies the existence of two antisets: Antiset bounded by points {1,2,3,4,5} encompasses the leader strategies for which the opponent response CANNOT be $a_{360}$; Antiset bounded by points {2,6,7,3,8} encompasses the leader strategies for which the opponent response CANNOT be $a_{370}$.

Similarly, in another embodiment, there is constructed two antisets implied by set 370 and two antisets implied by set 365. However, as the leader is playing a Bayesian Stackelberg game with a rational opponent repeatedly, the leader can probe the opponent in order to learn its preferences. Thus, by selective probing (i.e., sampling a leader action) observing the responses allows the leader make deductions regarding opponent strategies, e.g., by adding a point to the simplex space, and, according to the pruning method of FIG. 5, a convex set is added (knowing what opponent may play); and likewise, from the added point expanding anti-sets of what the leader knows the opponent will not play.

In one non-limiting example implementation of the pruning method depicted in FIG. 6, the mixed strategy deployed represents, for example, in the context of security domains, an allocation of resources. For example, security at a shopping mall has three access points (e.g. entrance and exit doors) with a single security guard (resource) patrolling. Thus, for example, the security agency employs a mixed strategy such that at each access point the guard protects a certain percentage of time shift or interval, e.g., a patrol of 45%, 45% and 10% at each of the three access points (not shown). This patrol may be performed every night for a month, during which the percentages of time are observed, providing an estimate of the probabilities of the leader's mixed strategy components. An opponent can attack a certain access point according to the estimated leader mixed strategy and, in addition can expect a certain payoff. For example, reward values of attacking doors 1,2,3, if successful, may be $200 M, $50 M, $10 k respectively. The leader does not know these payoffs. Suppose that the attacker attacks door 1. Since doors 1 and 2 are patrolled by the leader with equal probability 45%, the leader can then infer that attacking door 1 is more valuable to the follower than attacking door 2. As a next action, the leader may change the single security guard patrol mixed strategy responsive to the leader's observing the follower's opponents attack. Thus, a next mixed strategy may be 50%, 25% and 25% probabilities for patrolling each of access points 1,2,3. The access door 3 is then being further protected. Additional observations in subsequent rounds provide more information about follower preferences. The choice of leader strategies balances both exploitation (i.e., achieving high immediate payoff) and exploration (i.e. learning more about opponent preferences). In some rounds the leader may select a pure strategy, but this may be very risky. However, given the observed follower response, the leader may subsequently select a safer strategy. One goal is to maximize payoff after all the stages based on learned preferences of the opponent while the game is being played. The simulation model of the game and outcomes of simulated trials tells the leader at a particular stage what is the best action to take given what was already observed.

Thus, the present technique may be deployed in real domains that may be characterized as Bayesian Stackelberg games, including, but not limited to security and monitoring deployed at airports, and randomization in scheduling of Federal air marshal service, and other security applications.

Figure 7:
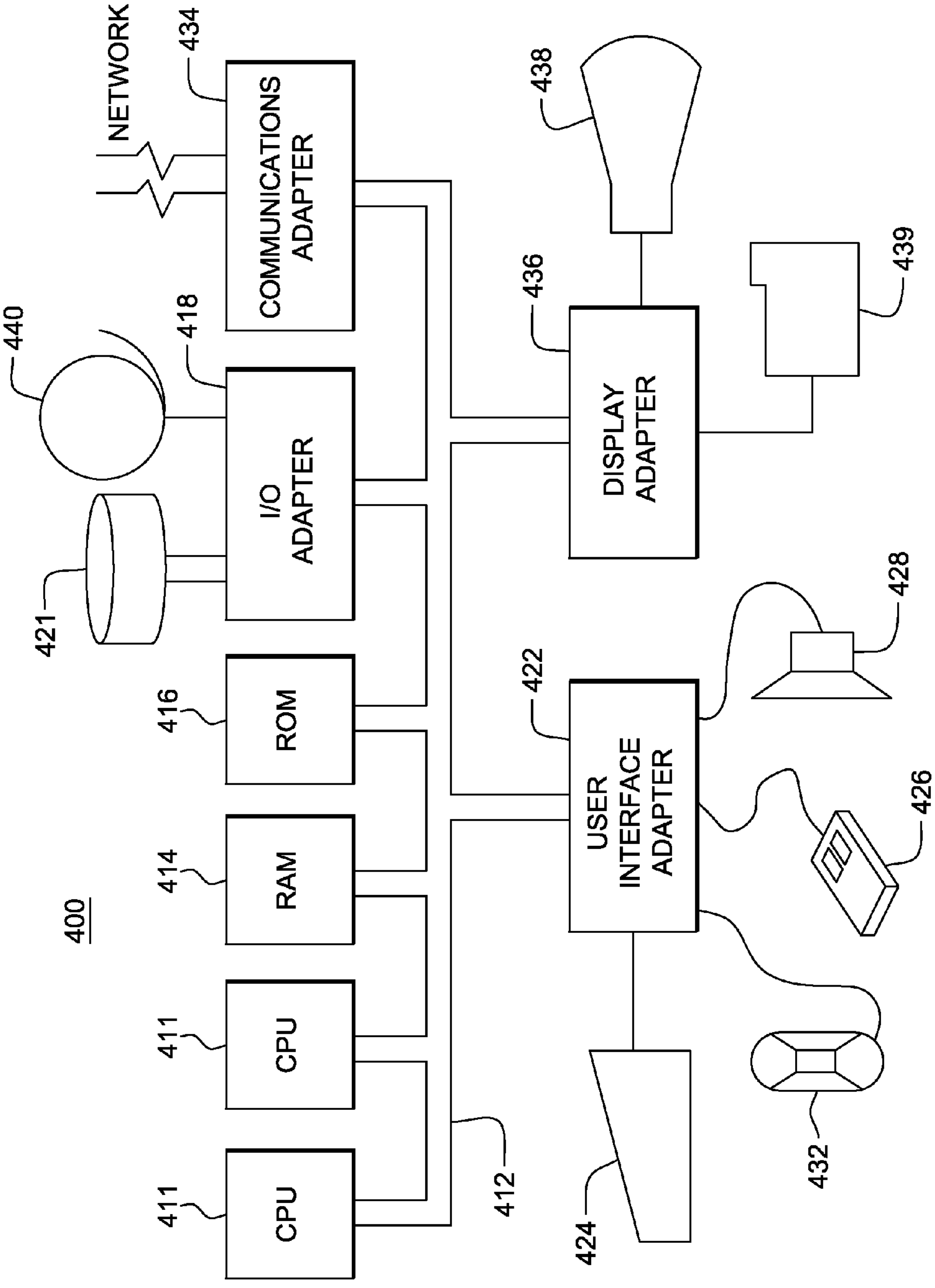

FIG. 7 illustrates an exemplary hardware configuration of a computing system 400 running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A method for planning actions in repeated Stackelberg games with unknown opponents, in which a prior probability distribution over preferences of the opponents is available, said method comprising:

running, in a simulator including a programmed processor unit, a plurality of simulation trials from a simulated initial state of a repeated Stackelberg game, that results in an outcome in the form of a utility to the leader, wherein one or more simulation trials comprises one or more rounds comprising:

selecting, by the leader, a mixed strategy to play in the current round;

determining at a current round, a response of the opponent, of type fixed at the beginning of a trial according to said prior probability distribution, to the leader strategy selected;

computing a utility of the leader strategy given the opponent response in the current round;

updating an estimate of expected utility for the leader action at this round; and, recommending, based on the estimated expected utility of available leader actions in said simulated initial state, an action to perform in said initial state of a repeated Stackelberg game, wherein a computing system including at least one processor and at least one memory device connected to the processor performs the running and the recommending.

2. The method as claimed in claim 1, wherein said simulation trials are run according to a Monte Carlo Tree Search method.

3. The method as claimed in claim 2, wherein said one or more rounds further comprises:

inferring opponent preferences given observed opponent responsive actions in prior rounds up to the current round.

4. The method as claimed in claim 3, wherein said inferring further comprises:

computing opponent best response sets and opponent best response anti-sets, said opponent best response set being a convex set including leader mixed strategies for which the leader has observed or inferred that the opponent will respond by executing an action, and said best response anti-sets each being a convex set that includes leader mixed strategies for which the leader has inferred that the follower will not respond by executing an action.

5. The method as claimed in claim 4, wherein, said processor device is further configured to perform pruning of leader strategies satisfying one or more of: a suboptimal expected payoff in the current round, and a suboptimal expected sum of payoffs in subsequent rounds.

6. The method as claimed in claim 1, wherein said leader actions are selected from among a finite set of leader mixed strategies, wherein said finite set comprises leader mixed strategies whose pure strategy probabilities are integer multiples of a discretization interval.

7. The method as claimed in claim 1, wherein said estimate of an expected utility of a leader action includes a benefit of information gain about an opponent response to said leader action combined with an immediate payoff for the leader for executing said leader action.

8. The method as claimed in claim 1, wherein said Stackelberg game is a Bayesian Stackelberg game.

9. The method as claimed in claim 3, wherein said updating the estimate of expected utility for the leader action at the current round comprises: averaging the utilities of the leader action at the current round, across multiple trials that share the same history of leader actions and follower responses up to the current round.

10. A system for planning actions in repeated Stackelberg games with unknown opponents in which a prior probability distribution over preferences of the opponents is available, said system comprising:

a memory storage device;

a processor unit in communication with the memory device that performs a method comprising:

running, in a simulator including a programmed processor unit, a plurality of simulation trials from a simulated initial state of a repeated Stackelberg game, that results in an outcome in the form of a utility to the leader, wherein one or more simulation trials comprises one or more rounds comprising:

selecting, by the leader, a mixed strategy to play in the current round;

determining at a current round, a response of the opponent, of type fixed at the beginning of a trial according to said prior probability distribution, to the leader strategy selected;

computing a utility of the leader strategy given the opponent response in the current round;

updating an estimate of expected utility for the leader action at this round; and, recommending, based on the estimated expected utility of available leader actions in said simulated initial state, an action to perform in said initial state of a repeated Stackelberg game.

11. The system as claimed in claim 10, wherein said simulation trials are run according to a Monte Carlo Tree Search method.

12. The system as claimed in claim 11, wherein-said one or more rounds further comprises:

inferring opponent preferences given observed opponent responsive actions in prior rounds up to the current round.

13. The system as claimed in claim 12, wherein said one or more rounds further comprises:

inferring opponent preferences given observed opponent responsive actions in prior rounds up to the current round.

14. The system as claimed in claim 13, wherein said inferring further comprises:

computing opponent best response sets and opponent best response anti-sets, said opponent best response set being a convex set including leader mixed strategies for which the leader has observed or inferred that the opponent will respond by executing an action, and said best response anti-sets each being a convex set that includes leader mixed strategies for which the leader has inferred that the follower will not respond by executing an action.

15. The system as claimed in claim 14, wherein, said processor device is further configured to perform pruning of leader strategies satisfying one or more of: a suboptimal expected payoff in the current round, and a suboptimal expected sum of payoffs in subsequent rounds.

16. The system as claimed in claim 10, wherein said leader actions are selected from among a finite set of leader mixed strategies, wherein said finite set comprises leader mixed strategies whose pure strategy probabilities are integer multiples of a discretization interval.

17. The system as claimed in claim 10, wherein said estimate of an expected utility of a leader action includes a benefit of information gain about an opponent response to said leader action combined with an immediate payoff for the leader for executing said leader action.

18. The system as claimed in claim 10, wherein said Stackelberg game is a Bayesian Stackelberg game.

19. The system as claimed in claim 12, wherein said updating the estimate of expected utility for the leader action at the current round comprises: averaging the utilities of the leader action at the current round, across multiple trials that share the same history of leader actions and follower responses up to the current round.

20. A computer program product for planning actions in repeated Stackelberg games with unknown opponents in which a prior probability distribution over preferences of the opponents is available, the computer program device comprising a tangible storage medium readable by a processing circuit and storing instructions run by the processing circuit for performing a method, the method comprising:

running, in a simulator including a programmed processor unit, a plurality of simulation trials from a simulated initial state of a repeated Stackelberg game, that results in an outcome in the form of a utility to the leader, wherein one or more simulation trials comprises one or more rounds comprising:

selecting, by the leader, a mixed strategy to play in the current round;

determining at a current round, a response of the opponent, of type fixed at the beginning of a trial according to said prior probability distribution, to the leader strategy selected;

computing a utility of the leader strategy given the opponent response in the current round;

updating an estimate of expected utility for the leader action at this round; and, recommending, based on the estimated expected utility of available leader actions in said simulated initial state, an action to perform in said initial state of a repeated Stackelberg game, wherein a computing system including at least one processor and at least one memory device connected to the processor performs the running and the recommending.

21. The computer program product as claimed in claim 20, wherein said simulation trials are run according to a Monte Carlo Tree Search method.

22. The computer program product as claimed in claim 21, wherein said one or more rounds further comprises:

inferring opponent preferences given observed opponent responsive actions in prior rounds up to the current round.

23. The computer program product as claimed in claim 22, wherein said inferring further comprises:

computing opponent best response sets and opponent best response anti-sets, said opponent best response set being a convex set including leader mixed strategies for which the leader has observed or inferred that the opponent will respond by executing an action, and said best response anti-sets each being a convex set that includes leader mixed strategies for which the leader has inferred that the follower will not respond by executing an action.

24. The computer program product as claimed in claim 23, wherein, said processor device is further configured to perform pruning of leader strategies satisfying one or more of: a suboptimal expected payoff in the current round, and a suboptimal expected sum of payoffs in subsequent rounds.

25. The computer program product as claimed in claim 20, wherein said leader actions are selected from among a finite set of leader mixed strategies, wherein said finite set comprises leader mixed strategies whose pure strategy probabilities are integer multiples of a discretization interval.

26. The computer program product as claimed in claim 20, wherein said estimate of an expected utility of a leader action includes a benefit of information gain about an opponent response to said leader action combined with an immediate payoff for the leader for executing said leader action.

27. The computer program product as claimed in claim 20, wherein said Stackelberg game is a Bayesian Stackelberg game.

28. The computer program product as claimed in claim 22, wherein said updating the estimate of expected utility for the leader action at the current round comprises: averaging the utilities of the leader action at the current round, across multiple trials that share the same history of leader actions and follower responses up to the current round.

* * * * *